(12) United States Patent
Maeda et al.

(10) Patent No.: US 11,273,409 B2
(45) Date of Patent: Mar. 15, 2022

(54) CATALYST DEVICE

(71) Applicant: HONDA MOTOR CO., LTD., Tokyo (JP)

(72) Inventors: Kazuhisa Maeda, Wako (JP);
Hiromitsu Takeda, Wako (JP);
Hiroyuki Horimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/266,131

(22) PCT Filed: Aug. 6, 2019

(86) PCT No.: PCT/JP2019/030839
§ 371 (c)(1),
(2) Date: Feb. 5, 2021

(87) PCT Pub. No.: WO2020/032002
PCT Pub. Date: Feb. 13, 2020

(65) Prior Publication Data
US 2021/0291113 A1  Sep. 23, 2021

(30) Foreign Application Priority Data

Aug. 10, 2018 (JP) .............................. JP2018-151738

(51) Int. Cl.
*F01N 3/28* (2006.01)
*B01D 53/94* (2006.01)
*B01J 35/04* (2006.01)

(52) U.S. Cl.
CPC .............. *B01D 53/94* (2013.01); *B01J 35/04* (2013.01); *F01N 3/2807* (2013.01); *B01D 2255/9155* (2013.01); *F01N 2330/02* (2013.01)

(58) Field of Classification Search
CPC .............. F01N 3/281; F01N 2510/068; F01N 2330/02; F01N 3/2807; B01J 35/04
(Continued)

(56) References Cited

U.S. PATENT DOCUMENTS

| | | | | |
|---|---|---|---|---|
| 4,152,302 A | * | 5/1979 | Nonnenmann | ....... F01N 3/2814 502/338 |
| 4,647,435 A | * | 3/1987 | Nonnenmann | .......... B01J 35/04 422/180 |

(Continued)

FOREIGN PATENT DOCUMENTS

| | | |
|---|---|---|
| EP | 0705962 | 12/2001 |
| JP | 59-127739 | 8/1984 |

(Continued)

OTHER PUBLICATIONS

International Search Report and Written Opinion for International Application No. PCT/JP2019/030839 dated Oct. 8, 2019, 10 pages.

(Continued)

*Primary Examiner* — Tom P Duong
(74) *Attorney, Agent, or Firm* — Amin, Turocy & Watson, LLP (57) ABSTRACT

Provided is a catalyst device that makes it possible to efficiently purify exhaust gas. A catalyst device that comprises: a carrier that is formed by stacking and rolling a metal-foil-shaped flat plate and a metal-foil-shaped corrugated plate and that carries a catalyst; and an outer cylinder that houses the carrier and supports the carrier such that one end part of the carrier is oriented toward an exhaust gas upstream side and another end part of the carrier is oriented toward an exhaust gas downstream side. The flat plate and the corrugated plate have a plurality of holes and are covered by a coating film that includes a catalyst substance. The coating film that covers the downstream side of the holes is (Continued)

thicker than the coating film that covers the upstream side of the holes.

5 Claims, 12 Drawing Sheets

(58) Field of Classification Search
USPC .......................................................... 422/180
See application file for complete search history.

(56) References Cited

U.S. PATENT DOCUMENTS

| | | | | |
|---|---|---|---|---|
| 4,987,034 | A * | 1/1991 | Hitachi | ................. F01N 3/2821 428/593 |
| 5,376,610 | A | 12/1994 | Takahata et al. | |
| 5,514,347 | A * | 5/1996 | Ohashi | ...................... B22F 5/00 422/174 |
| 5,599,509 | A * | 2/1997 | Toyao | ...................... B01J 35/04 422/177 |
| 5,618,501 | A | 4/1997 | Wieres et al. | |
| 5,648,050 | A * | 7/1997 | Matsumoto | .............. B01J 35/04 422/169 |
| 5,758,498 | A | 6/1998 | Fukui | |
| 5,866,210 | A | 2/1999 | Rosynsky et al. | |
| 6,761,980 | B2 * | 7/2004 | Sato | ........................ F01N 3/281 428/593 |
| 7,030,059 | B2 * | 4/2006 | Tanabe | .................... B01J 35/04 422/180 |
| 7,261,865 | B2 | 8/2007 | Bruck | |
| 7,934,925 | B2 * | 5/2011 | Carroni | ................... F23C 13/00 431/7 |
| 7,981,498 | B2 * | 7/2011 | Maus | .................... F01N 3/0222 428/116 |
| 8,288,010 | B2 * | 10/2012 | Althofer | ................. F01N 3/281 428/593 |
| 9,893,505 | B2 * | 2/2018 | Brück | ....................... B03C 3/41 |
| 2001/0026838 | A1 | 10/2001 | Dettling et al. | |
| 2005/0170957 | A1 | 8/2005 | Maus et al. | |
| 2009/0214406 | A1 | 8/2009 | Quell | |

FOREIGN PATENT DOCUMENTS

| | | |
|---|---|---|
| JP | 62-090742 | 6/1987 |
| JP | 05-293376 | 11/1993 |
| JP | 06-081638 | 3/1994 |
| JP | 06-254413 | 9/1994 |
| JP | 07-088360 | 4/1995 |
| JP | 07-289918 | 11/1995 |
| JP | 2000-237600 | 9/2000 |
| JP | 2000-512896 | 10/2000 |
| JP | 2005-535454 | 11/2005 |
| JP | 2006-231167 | 9/2006 |
| JP | 2010-051938 | 3/2010 |
| JP | 5199291 | 5/2013 |
| JP | 2014-147879 | 8/2014 |

OTHER PUBLICATIONS

Indian Office Action for Indian Patent Application No. 202117008955 dated Apr. 26, 2021.
Extended European Search Report for European Patent Application No. 19846090.9 dated Sep. 7, 2021.
Official Communication of Third Party Observation for European Patent Application No. 19846090.9 dated Oct. 13, 2021.

* cited by examiner

CATALYST DEVICE

TECHNICAL FIELD

The present invention relates to a catalyst device that is formed by a flat plate and a corrugated plate being stacked and rolled and supports a catalyst support that supports a catalyst by housing the catalyst support in an outer cylinder.

BACKGROUND ART

A vehicle provided with an internal combustion engine includes an exhaust system for discharging out of the vehicle exhaust gas that is generated in a combustion process of the internal combustion engine. The exhaust system includes a catalyst device that cleans up the exhaust gas. In Japanese Laid-Open Patent Publication No. 2014-147879, a catalyst device for a small internal combustion engine that is provided in a motorcycle is disclosed. This catalyst device includes a catalyst support that supports a catalyst and an outer cylinder that supports the catalyst support by housing the catalyst support. The catalyst support is formed by a thinned metal flat plate and a thinned metal corrugated plate being stacked and rolled. Japanese Laid-Open Patent Publication No. 2005-535454 (PCT) discloses a honeycomb body with holes (a catalyst support) that is formed by flat thin plate (flat plate) and corrugated thin plate (corrugated plate), each plate having holes.

SUMMARY OF INVENTION

In order for the catalyst device to efficiently clean up the exhaust gas, it is desirable that the exhaust gas and the catalyst should contact (collide) each other frequently. One method is to cause turbulence in the exhaust gas flowing in the catalyst device. As the catalyst support of Japanese Laid-Open Patent Publication No. 2005-535454 (PCT), when the flat plate and the corrugated plate have holes, the shape of a flow path in the catalyst support becomes complex, whereby turbulence occurs.

However, when the surfaces of the flat plate and the corrugated plate are flat, part of the exhaust gas could flow straight. As a result, the cleanup of the exhaust gas will be unsatisfactory.

The present invention has been made in view of such problems and an object thereof is to provide a catalyst device that can efficiently clean up the exhaust gas.

The present invention is a catalyst device including:

a catalyst support that is formed by a thinned metal flat plate and a thinned metal corrugated plate being stacked and rolled and that supports a catalyst; and an outer cylinder that houses the catalyst support therein and supports the catalyst support with one end of the catalyst support made to face an upstream side of exhaust gas and another end of the catalyst support made to face a downstream side of the exhaust gas, wherein the flat plate and the corrugated plate include a plurality of holes and are covered with a coating having a nonuniform thickness and containing a catalytic material.

According to the present invention, it is possible to efficiently clean up the exhaust gas.

DESCRIPTION OF EMBODIMENTS

Hereinafter, preferred embodiments of a catalyst device according to the present invention will be described in detail with reference to the accompanying drawings.

In the descriptions below, upstream and downstream are defined with respect to the flow of exhaust gas.

[1. Exhaust System 14]

Figure 1:
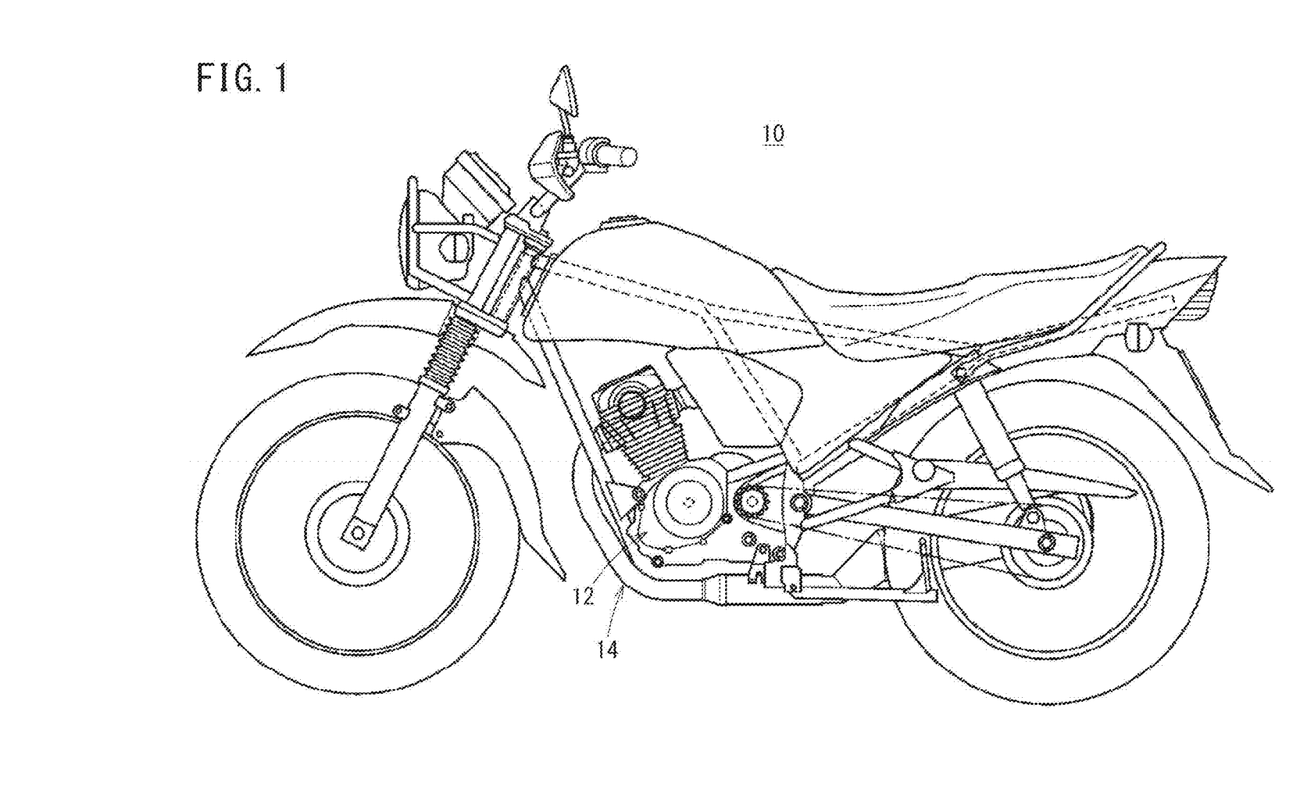
FIG. 1 is a left side view of a motorcycle.

As depicted in FIG. 1, a motorcycle 10 includes an internal combustion engine 12 as a drive source for travel. To the internal combustion engine 12, an exhaust system 14 is connected.

Figure 2:
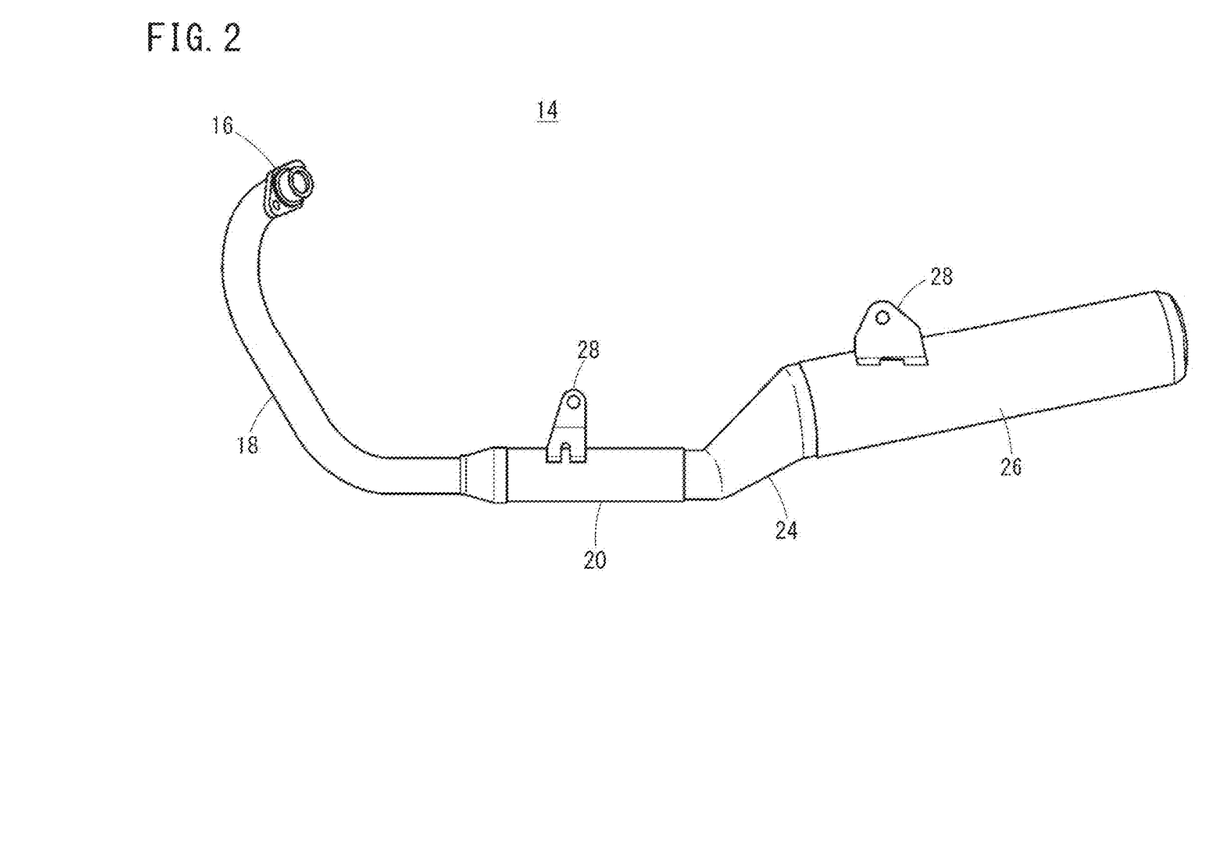
FIG. 2 is a left side view of an exhaust system.

As depicted in FIG. 2, the exhaust system 14 includes a flange 16, an upstream-side exhaust pipe 18, a catalyst storing portion 20, a downstream-side exhaust pipe 22 (FIG. 3), a heat shield cover 24, and a muffler 26. The upstream-side exhaust pipe 18 is connected to a cylinder head of the internal combustion engine 12 by the flange 16. The catalyst storing portion 20 is connected to a downstream-side end of the upstream-side exhaust pipe 18. The configuration of the catalyst storing portion 20 will be described in [2] below. The downstream-side exhaust pipe 22 (FIG. 3) is connected to a downstream-side end of the catalyst storing portion 20. The heat shield cover 24 is connected to the downstream-side end of the catalyst storing portion 20 in such a way as to cover the downstream-side exhaust pipe 22. The muffler 26 is connected to downstream-side ends of the downstream-side exhaust pipe 22 and the heat shield cover 24. The exhaust system 14 is attached to a frame of a vehicle body by one or more stays 28. With this structure, exhaust gas that is discharged from the internal combustion engine 12 is discharged to the outside after passing through the upstream-side exhaust pipe 18, the catalyst storing portion 20, the downstream-side exhaust pipe 22, and the muffler 26.

[2. Catalyst Storing Portion 20]

Figure 3:
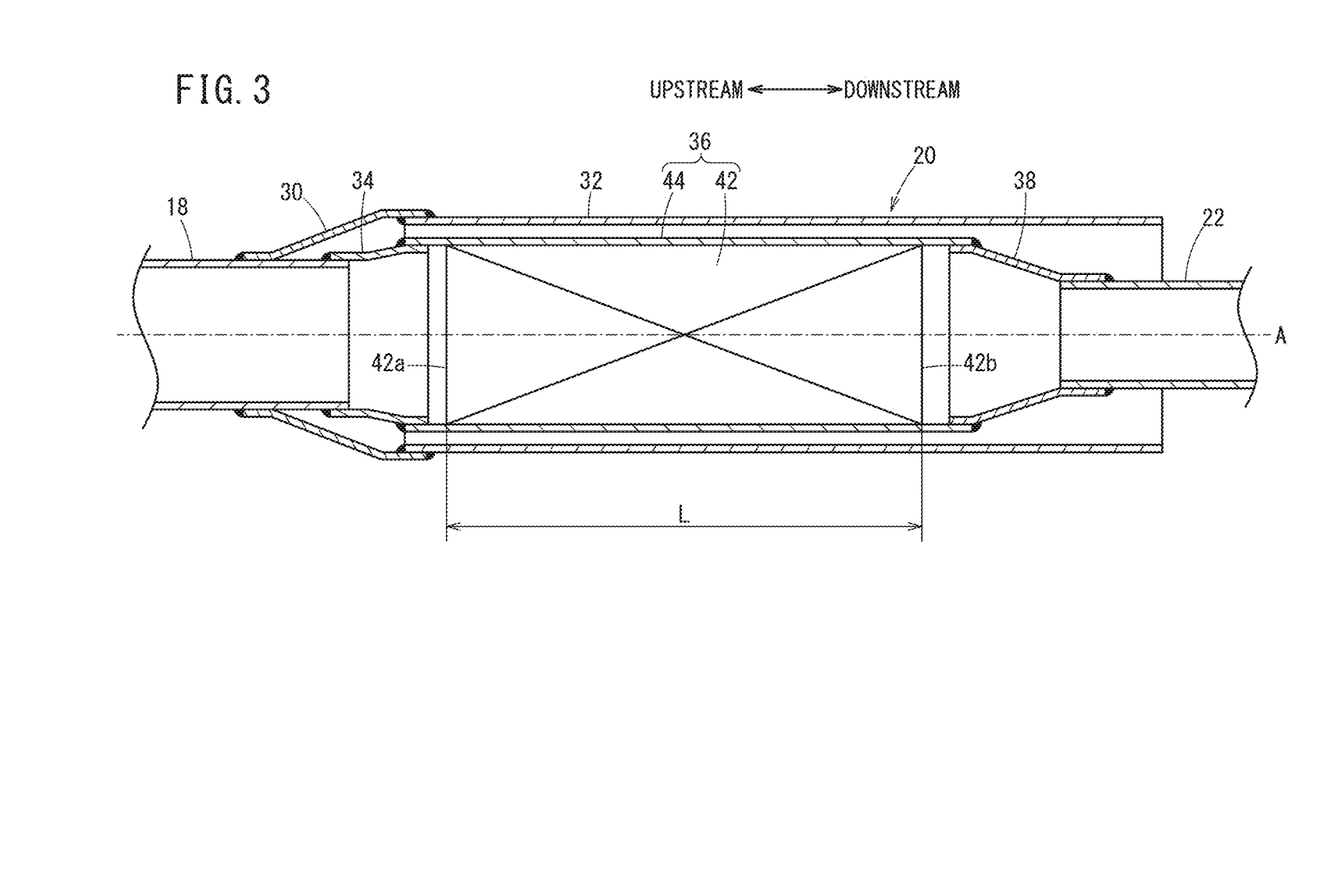
FIG. 3 is a sectional view of a catalyst storing portion.

As depicted in FIG. 3, the catalyst storing portion 20 includes an outer taper pipe 30, a heat shield pipe 32, an upstream-side inner taper pipe 34, a catalyst device 36, and a downstream-side inner taper pipe 38. The outer taper pipe 30 is connected to the downstream-side end of the upstream-side exhaust pipe 18. The heat shield pipe 32 is connected to a downstream-side end of the outer taper pipe 30. The upstream-side inner taper pipe 34 is connected to the downstream-side end of the upstream-side exhaust pipe 18 at a downstream side site from a connection between the outer taper pipe 30 and the upstream-side exhaust pipe 18, and is located inside the outer taper pipe 30. The catalyst device 36 is connected to a downstream-side end of the upstream-side inner taper pipe 34 and located inside the heat shield pipe 32. The configuration of the catalyst device 36 will be described in [3] below. The downstream-side inner taper pipe 38 is connected to a downstream-side end of the catalyst device 36 and located inside the heat shield pipe 32.

[3. Catalyst Device 36]

Figure 4:
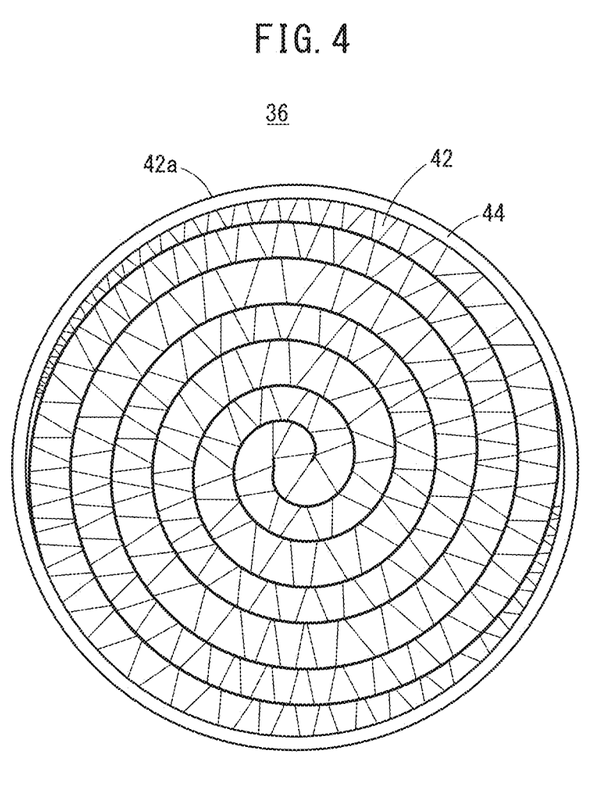
FIG. 4 is a schematic diagram schematically depicting a catalyst device viewed from an upstream side.

As depicted in FIGS. 3 and 4, the catalyst device 36 includes a catalyst support 42 and an outer cylinder 44. The catalyst support 42 is substantially in the shape of a cylinder having a honeycomb structure and is formed by one or more thinned metal flat plates 52 (FIG. 9) and one or more corrugated plates 54 (FIG. 9) that are corrugated thinned metal flat plates 52, with the thinned metal flat plates 52 and the corrugated plates 54 being stacked and rolled. Each flat plate 52 (and each corrugated plate 54) is formed of stainless steel and has a plurality of holes 64 (FIG. 5) passing therethrough from one side to the other side. The holes 64 will be described in [3.1] below.

The catalyst support 42 supports a catalyst. For example, in the state of the catalyst support 42, the surfaces of the flat plate 52 and the corrugated plate 54 are covered with coating containing a catalytic material (for instance, elements of the platinum group, such as platinum, palladium, and rhodium). The flat plate 52 and the corrugated plate 54 are joined to each other. Joining of the flat plate 52 and the corrugated plate 54 will be described in [3.2] below.

The outer cylinder 44 is a cylinder whose inner diameter is slightly larger than the outer diameter of the catalyst support 42. As in the case of the flat plate 52, the outer cylinder 44 is formed of stainless steel. The outer cylinder 44 houses the catalyst support 42. The outer cylinder 44 supports the catalyst support 42 in a state in which one end 42a of the catalyst support 42 is made to face the upstream side of the exhaust gas and another end 42b of the catalyst support 42 is made to face the downstream side of the exhaust gas. In a state in which the outer cylinder 44 is supporting the catalyst support 42, the axis of the outer cylinder 44 and the axis of the catalyst support 42 coincide with each other. As depicted in FIG. 3, the axis of the outer cylinder 44 and the catalyst support 42 is referred to as an axis A. The outer circumferential surface of the catalyst support 42 and the inner circumferential surface of the outer cylinder 44 are joined to each other. Joining of the catalyst support 42 and the outer cylinder 44 will be described in [3.2] below.

[3.1. Flat Plate 52 with Holes 64]

Figure 5:
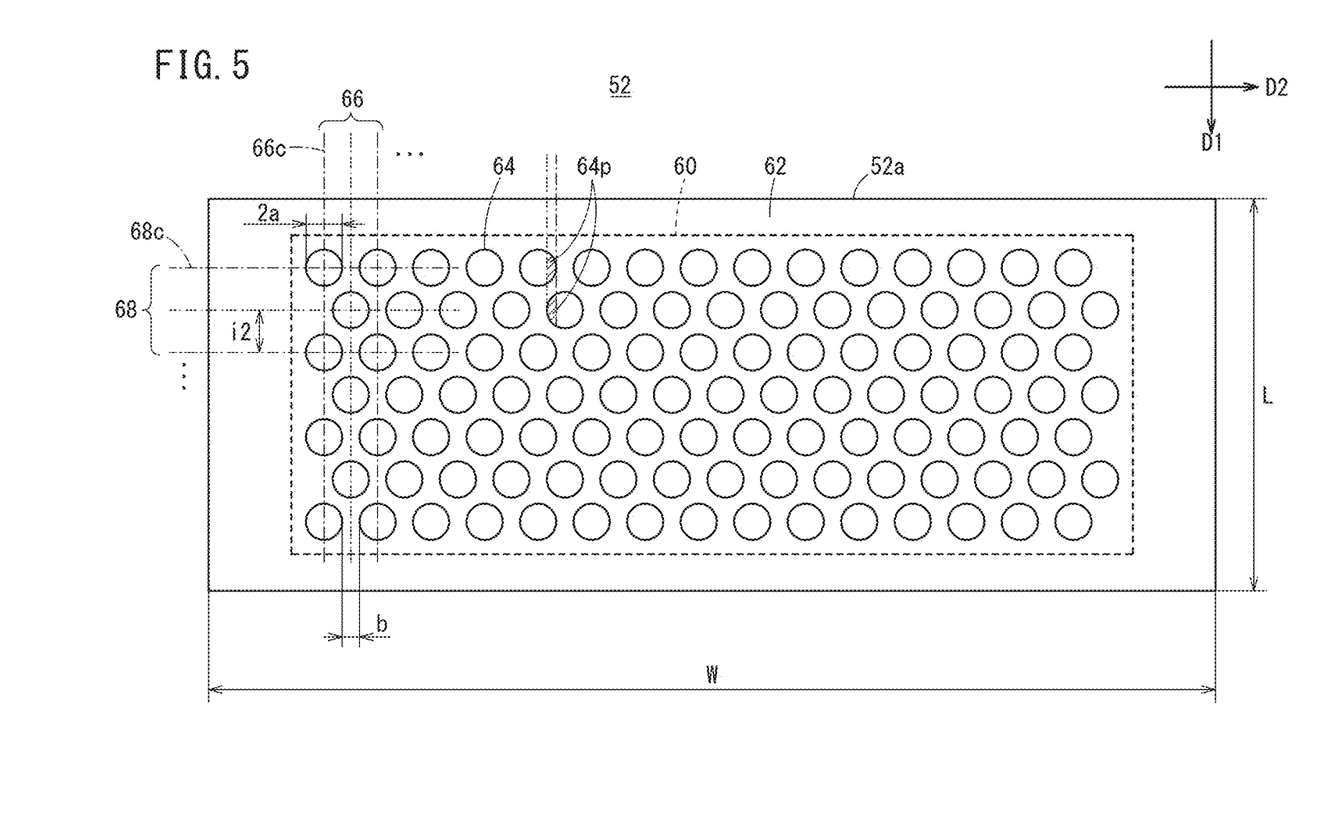
FIG. 5 is a schematic diagram schematically depicting a flat plate.

The flat plate 52 will be described by using FIG. 5. The flat plate 52 depicted in FIG. 5 is in a flat state in which the flat plate 52 is not yet shaped into the catalyst support 42. The flat plate 52 is a substantially rectangular thinned metal member of a length L in a first direction D1 and a length W (>L) in a second direction D2. The first direction D1 is parallel to the direction of the flow of the exhaust gas and the direction of the axis of the catalyst support 42 (a direction in which the axis A extends). In FIG. 5, a direction from the top to the bottom on the plane of paper is assumed to be the first direction D1. The second direction D2 is orthogonal to the first direction D1. In FIG. 5, a direction from the left to the right on the plane of paper is assumed to be the second direction D2. The length L of the flat plate 52 in the first direction D1 is the length of the catalyst support 42 in the direction of the axis thereof. The length W of the flat plate 52 in the second direction D2 is related to the diameter of the catalyst support 42. Therefore, the length L and the length W are determined in accordance with the design of the catalyst support 42.

The flat plate 52 has a hole formation portion 60 and an edge portion 62 surrounding the hole formation portion 60. The flat plate 52 has, in the hole formation portion 60, a plurality of holes 64 aligning in the first direction D1 and the second direction D2. A line of the holes 64 in the first direction D1 is referred to as a first line 66. A line of the holes 64 in the second direction D2 is referred to as a second line 68. When a line connecting the centers of the holes 64 in the first line 66 is called a center line 66c of the line, the holes 64 are arranged in such a way that the center lines 66c are spaced uniformly. When a line connecting the centers of the holes 64 in the second line 68 is called a center line 68c of the line, the holes 64 are arranged in such a way that the center lines 68c are spaced uniformly.

The first lines 66 are numbered consecutively toward the second direction D2. The holes 64 on an n-th first line 66 and the holes 64 on an n+1-th first line 66 alternately form a line when viewed from one (or the other) side of the second direction D2. That is, when viewed from one (or the other) side of the second direction D2, one hole 64 of the n+1-th first line 66 is disposed between two holes 64 that are adjacent to each other in the n-th first line 66 and one hole 64 of the n-th first line 66 is disposed between two holes 64 that are adjacent to each other in the n+1-th first line 66.

Likewise, the second lines 68 are numbered consecutively from one side to the other side in the first direction D1. The holes 64 on an n-th second line 68 and the holes 64 on an n+1-th second line 68 alternately form a line when viewed from one (or the other) side of the first direction D1. That is, when viewed from one (or the other) side in the first direction D1, one hole 64 of the n+1-th second line 68 is disposed between two holes 64 that are adjacent to each other in the n-th second line 68 and one hole 64 of the n-th second line 68 is disposed between two holes 64 that are adjacent to each other in the n+1-th second line 68.

Of two (n-th and n+1-th) adjacent first lines 66, the holes 64 on one (n-th) first line 66 and the holes 64 on the other (n+1-th) first line 66 overlap each other by portions 64p when viewed from the first direction D1. The length of each of the overlapping portions 64p in the second direction D2 is more than 0 and less than or equal to 20% of the length (for instance, the diameter 2a) of the holes 64 in the second direction D2. On the other hand, of two (n-th and n+1-th) second lines 68, the holes 64 on one (n-th) second line 68 and the holes 64 on the other (n+1-th) second line 68 are separated from each other when viewed from the second direction D2.

Here, a specific example of the flat plate 52 will be described. The hole 64 is circular in shape. The radius a of the hole 64 is 4.0 mm (the diameter thereof is 8.0). The interval i2 between the second lines 68 that are adjacent to each other (that is, the interval i2 between an n-th second line 68 and an n+1-th second line 68) is 9.52 mm. The distance b between the ends of two holes 64 that are adjacent to each other is 3.0 mm.

These shapes and numerical values are given by way of example and other shapes and numerical values may be adopted. For instance, the hole 64 may be oval in shape; in that case, any one of the major axis and the minor axis may be parallel to the first direction D1 or the second direction D2.

Moreover, the size (for example, the diameter 2a) of the holes 64 that are disposed in the region of the portions 64p may be smaller than the size (for example, the diameter 2a) of the holes 64 that are disposed in another region. In particular, it is preferable to make smaller the size of the holes 64 included in given second lines 68 (1st to k-th second lines 68) counted up from the second line 68 on the upstream side, that is, from a first end 52*a* side that is the one end 42*a* of the catalyst support 42. Specifically, when the hole 64 is circular in shape, the size and arrangement of the holes 64 can be set so that a relation, the distance b> the radius a, holds. Making smaller the size of the holes 64 on the upstream side increases durability to withstand the vibration (that is called fluttering) of the catalyst support 42 caused by pulsation of the exhaust gas.

The corrugated plate 54 is formed by elongating the flat plate 52 in the second direction D2 into a thinned metal member and processing the thinned metal member into the form of waves arranged in the second direction D2. The outer shape of the corrugated plate 54 is substantially the same as that of the flat plate 52 when viewed in a plan view. Amplitude of the waves of the corrugated plate 54 gradually increases and decreases: the waves of the corrugated plate 54 forms, for example, a sinusoidal wave. The holes 64 of the corrugated plate 54 are arranged in the same manner as those of the flat plate 52. However, since the corrugated plate 54 is longer than the flat plate 52 in the second direction D2, the hole formation portion 60 is wider in the second direction D2 and there are more holes 64.

[3.2. Joining of Members]

[3.2.1. Joining on the Upstream Side]

Figure 6:
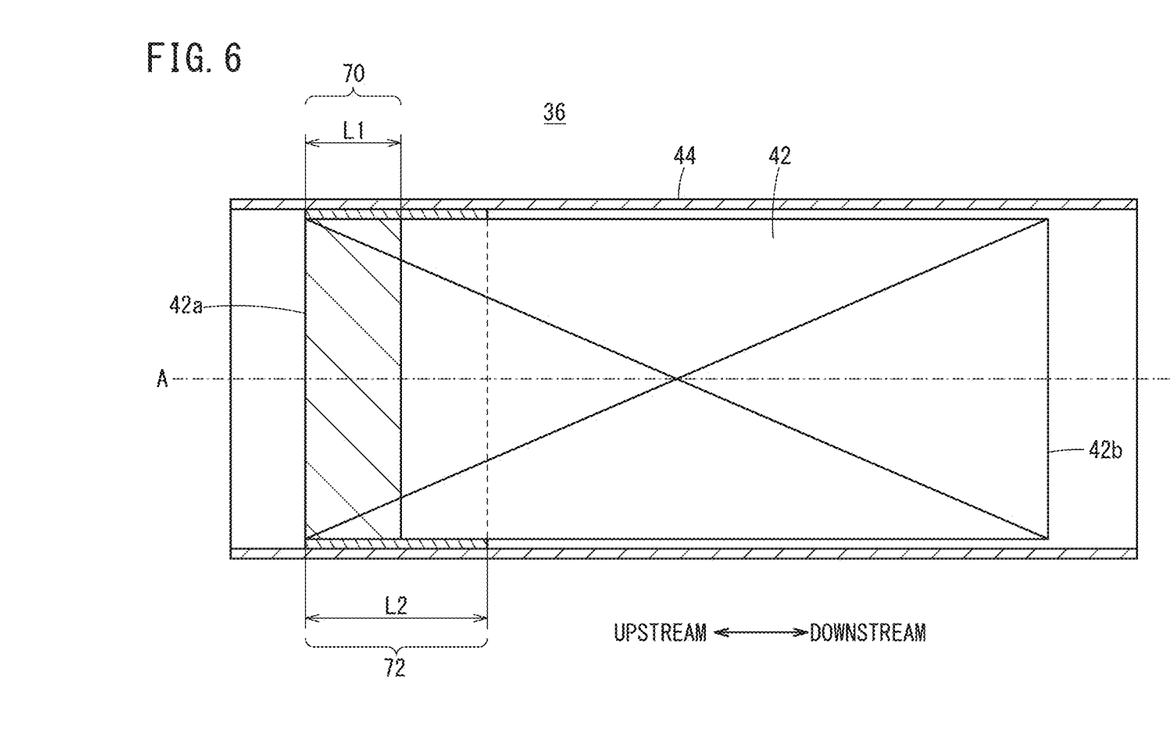
FIG. 6 is an explanatory diagram for an explanation of a brazing part.

Joining of the flat plate 52 and the corrugated plate 54 and joining of the catalyst support 42 and the outer cylinder 44 will be described by using FIG. 6. FIG. 6 shows joint areas of the members in the catalyst device 36 depicted in FIG. 3. The flat plate 52 and the corrugated plate 54 are joined together by brazing, and the catalyst support 42 and the outer cylinder 44 are also joined together by brazing.

In the present embodiment, a portion on the upstream side in which the flat plate 52 and the corrugated plate 54 are brazed to one another is referred to as a first upstream area 70 and a portion in which the catalyst support 42 and the outer cylinder 44 are brazed to one another is referred to as a second upstream area 72. The first upstream area 70 is an area that spreads from the position of the one end 42*a* of the catalyst support 42 to a position that is away therefrom by a length L1 to the downstream side in the direction of the axis. The second upstream area 72 is an area that spreads from the position of the one end 42*a* of the catalyst support 42 to a position away therefrom by a length L2 to the downstream side in the direction of the axis. The length L2 is longer than the length L1. That is, the second upstream area 72 is wider than the first upstream area 70 to the downstream side in the direction of the axis.

In the catalyst support 42 located in the first upstream area 70, the flat plate 52 and the corrugated plate 54 are brazed to each other from the center to the outer circumference. The first upstream area 70 contains the edge portions 62 of the flat plate 52 and the corrugated plate 54 and a plurality of holes 64 on the first to k-th (given ordinal number) second lines 68. Substantially peak parts of wave portions included in the corrugated plate 54 are brazed to the flat plate 52. However, it is difficult to braze all the contact points between the flat plate 52 and the corrugated plate 54 that are included in the first upstream area 70. For this reason, in the present embodiment, brazing all the contact points is not required.

The catalyst support 42 and the outer cylinder 44 that are located in the second upstream area 72 are brazed to each other. Specifically, the outer circumferential surface of the catalyst support 42 and the inner circumferential surface of the outer cylinder 44 are brazed to one another.

The closer to the upstream side, the greater the vibration of the catalyst device 36 is. By joining the flat plate 52 and the corrugated plate 54 together in the first upstream area 70 and joining the catalyst support 42 and the outer cylinder 44 together in the second upstream area 72 as in the present embodiment, it is possible to efficiently suppress the vibration of the catalyst support 42. Furthermore, since the members are not joined together along the length of the catalyst support 42, it is possible to prevent the catalyst support 42 from being damaged as a result of the members expanding and contracting under the influence of heat.

[4. Coating of Catalytic Material]

Figure 7:
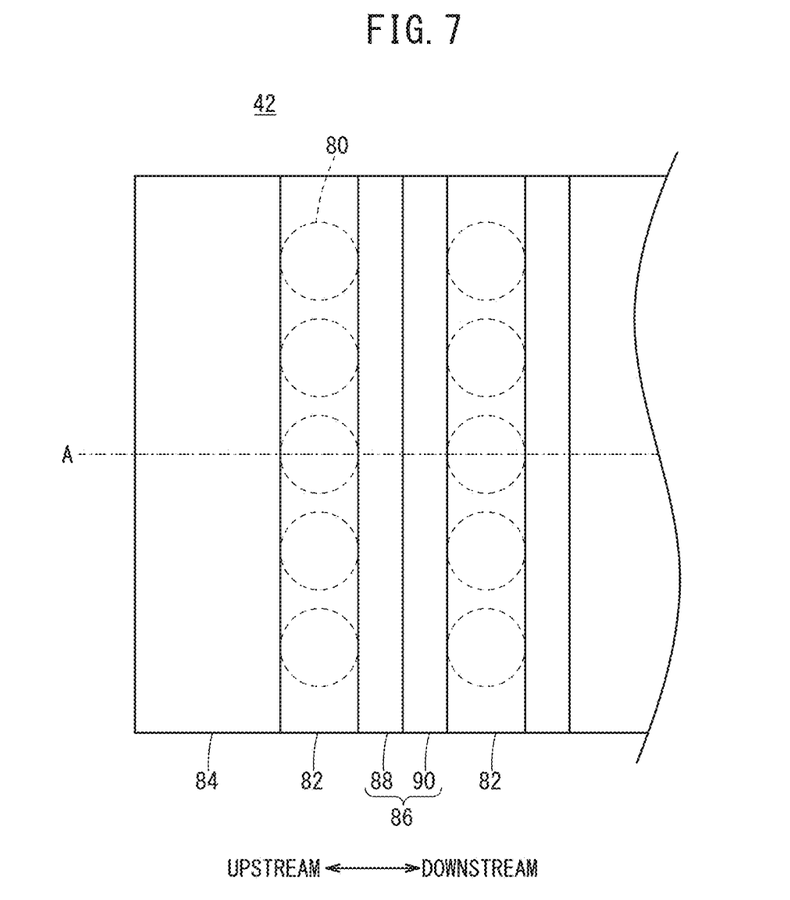
FIG. 7 is a schematic diagram depicting part of a cut surface of a catalyst support cut along an axial line.
Figure 8:
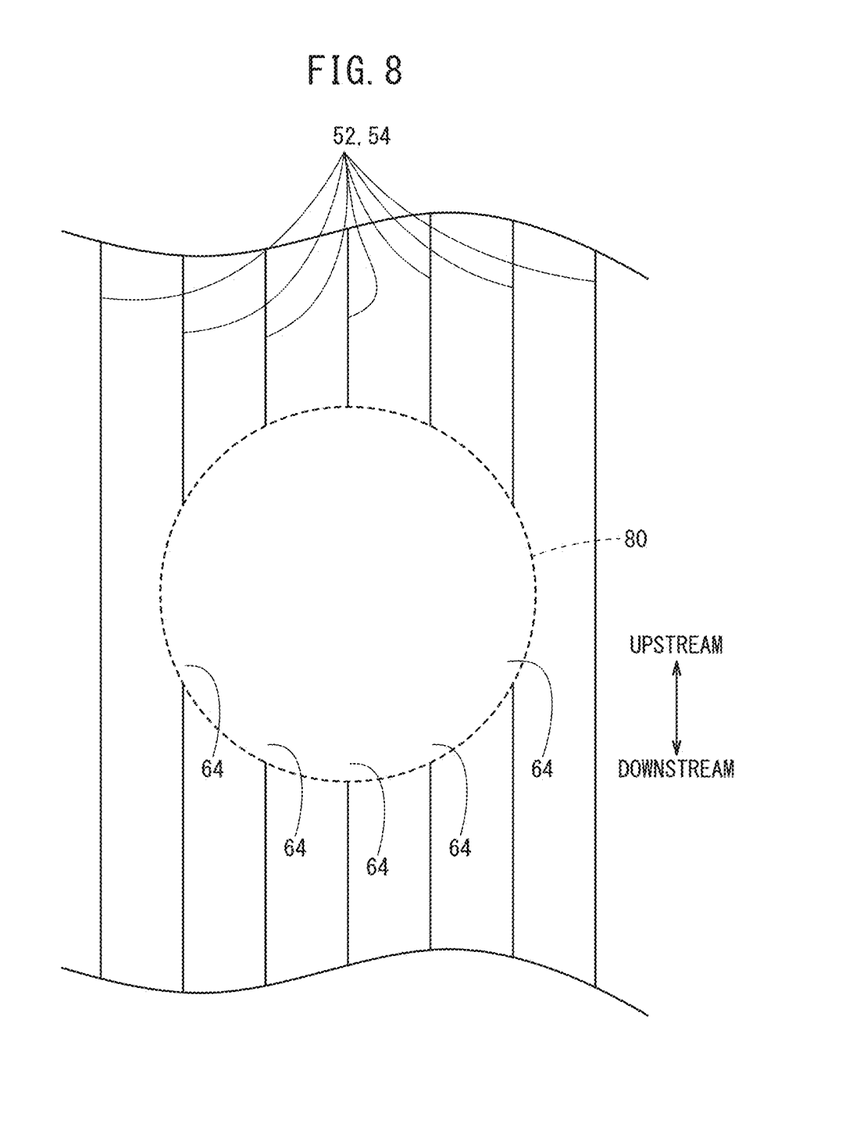
FIG. 8 is an explanatory diagram for a hole.
Figure 9:
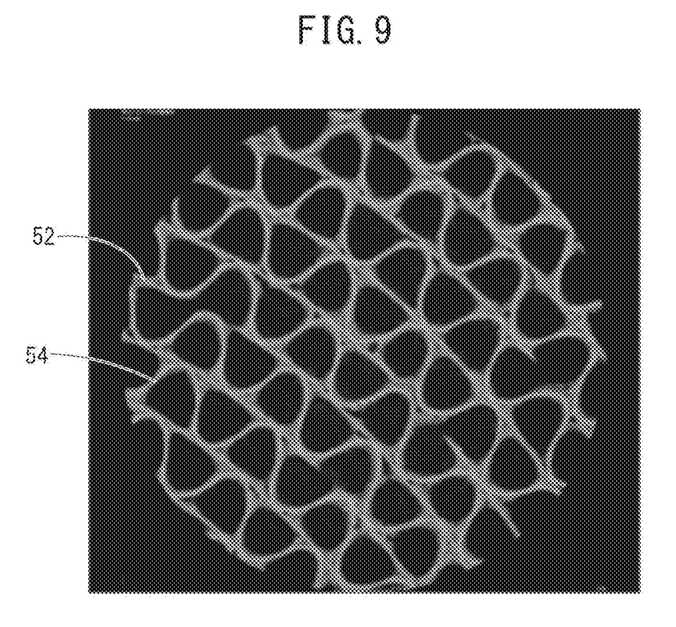
FIG. 9 is a partial cross section of the first inter-hole area on a plane perpendicular to the axial line direction.

With reference to FIGS. 7 to 9, a coating of catalytic material covering an inner surface of the catalyst support 42 is explained.

The catalyst support 42 is formed by the flat plate 52 illustrated in FIG. 5 and the corrugated plate 54 having the same arrangement of the holes 64 as that of the holes of the flat plate 52. When the catalyst support 42 is cut along the axial line A, part of the cross section becomes one as shown in FIG. 7. In this cross section, there are provided hole portions 80 where the flat plate 52 and the corrugated plate 54 are not present. As shown in FIG. 8, the hole portions 80 are formed by holes 64 of the flat plate 52 or the corrugated plate 54; in particular, the holes 64 on the same second lines 68 gather to form the hole portions 80. When a region where the hole portions 80 are formed in relation to the axial line direction is called a hole forming region 82, hole forming regions 82 are present at approximately equal intervals from the upstream side to the downstream side of the catalyst support 42. This interval corresponds to the distance between the downstream side end of a hole 64 on the n-th second line 68 and the upstream side end of a hole 64 on the (n+1)-th second line 68.

In the cross section illustrated in FIG. 7, at the most upstream side, there is an edge region 84 that corresponds to the edge portion 62. After the edge region 84, the hole forming regions 82 and inter-hole regions 86 where the hole portions 80 are not formed are alternately present from the upstream side to the downstream side. Further, the inter-hole region 86 is divided into a first inter-hole region 88 located on the downstream side of the hole forming region 82 and a second inter-hole region 90 located on the upstream side of the hole forming region 82.

Figure 10:
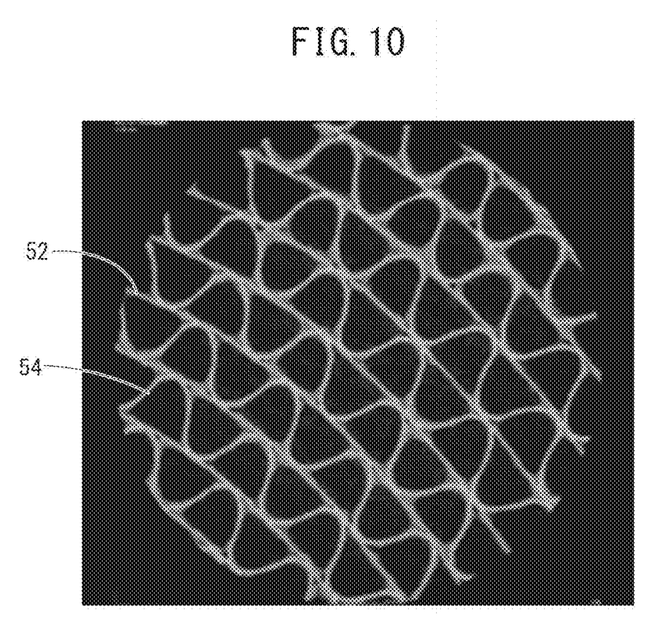
FIG. 10 is part of a partial cross section of the second inter-hole area on the plane perpendicular to the axial line direction.

The thickness of the coating that covers the flat plate 52 and the corrugated plate 54 is explained here. By comparison, the coating formed on the hole forming regions 82 and the first inter-hole regions 88 is thicker whereas the coating formed on the edge region 84 and the second inter-hole regions 90 is thinner. FIG. 9 is a partial cross section of the first inter-hole region 88 on a plane perpendicular to the axial line direction. FIG. 10 is part of a partial cross section of the second inter-hole region 90 on the plane perpendicular to the axial line direction. It is known from FIGS. 9 and 10 that the flat plates 52 and the corrugated plates 54 shown in FIG. 9 are covered with a larger amount of coating than the flat plates 52 and the corrugated plates 54 shown in FIG. 10.

It is difficult to quantitatively specify the thickness of the coating in each region. For this reason, in this specification, an opening ratio is considered instead of the thickness of the coating in each region. The opening ratio is defined as a ratio of an area of voids (an area of a portion where the flat plate 52, the corrugated plate 54, and the coating are missing) to a cross-sectional area of the catalyst support 42 that is perpendicular to the axial line direction. At every position of the inter-hole region 86 in the axial line direction, the cross-sectional areas of the flat plate 52 and the corrugated plate 54 are approximately equal. Thus, the opening ratio depends on the amount (cross-sectional area) of coating at a position—in other words, the thickness of the coating.

Figure 11:
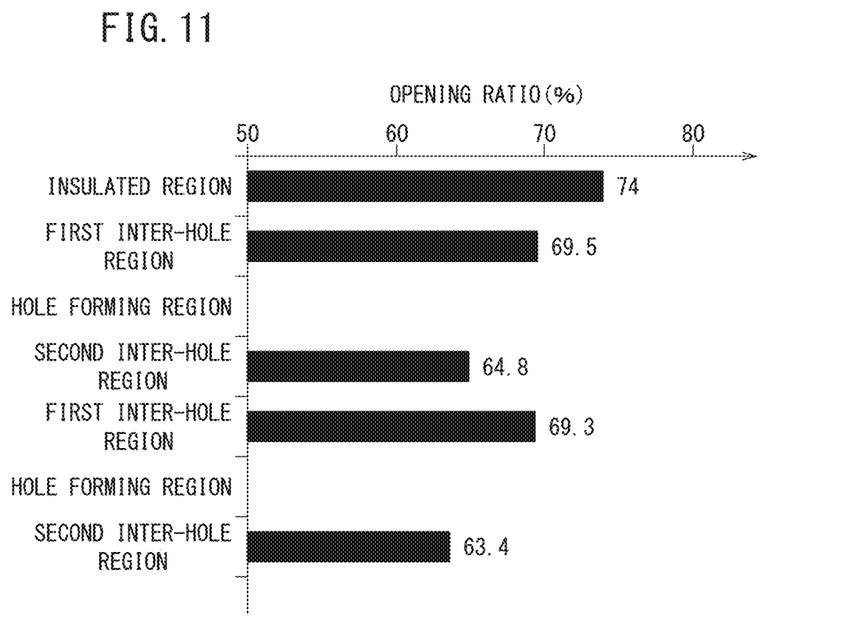
FIG. 11 is an explanatory diagram for a result of the analysis of an opening ratio.

FIG. 11 shows results of an analysis of the opening ratio conducted by the inventors. As can be seen from FIG. 11, the opening ratio of the first inter-hole region 88 is larger than that of the second inter-hole region 90 by about 5%. This means that the coating on the first inter-hole region 88 is thicker than the coating on the second inter-hole region 90. Since the hole portion 80 is a group of the holes 64, the same feature can apply to a single hole 64. That is, the coating that covers the downstream side of the hole 64 is thicker than the coating that covers the upstream side of the hole 64.

Moreover, the coating on the hole forming region 82—the coating that covers a portion (flat plate 52 and corrugated plate 54) other than the hole portion 80 located in the hole forming region 82—is also thicker. The coating on the hole forming region 82 is thicker than the coating on the second inter-hole region 90 by 20% or more.

When the coating on the hole forming region 82 and the first inter-hole region 88 is set to be thicker than the coating on the second inter-hole region 90, turbulence (vortex, eddy) easily occurs in the exhaust gas flowing through the catalyst support 42. When the turbulence occurs in the exhaust gas, the exhaust gas has more opportunities to contact the catalyst, whereby the efficiency of the exhaust gas cleanup improves.

From a viewpoint of turbulence creation, the coating of the second inter-hole region 90 may be thicker than the coating of the first inter-hole region 88. That is, the inner surface of the catalyst support 42 is covered with coating that has at least a nonuniform thickness from the upstream side to the downstream side. In this specification, the nonuniform thickness means that the difference in thickness between the thickest coating and the thinnest coating is 3% or more.

[5. Method for Producing Catalyst Device 36]

Figure 12:
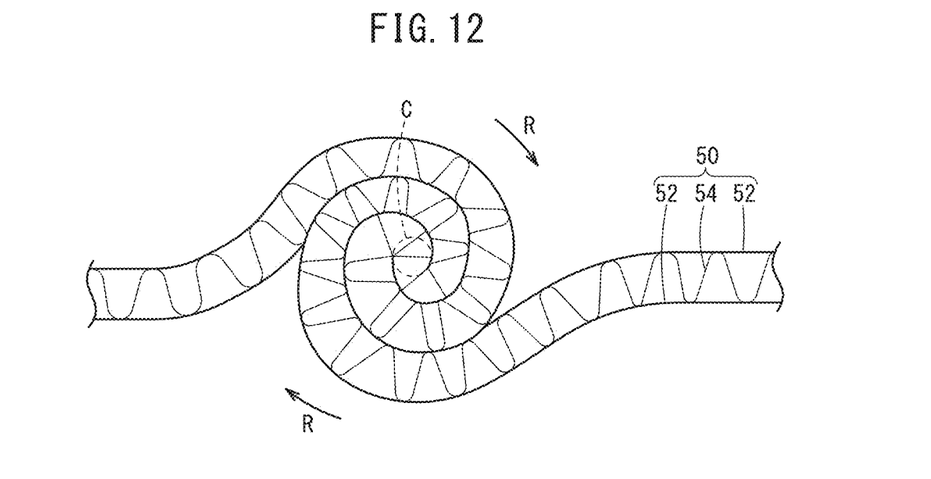
FIG. 12 is an explanatory diagram for a manufacturing method of the catalyst support.

As depicted in FIG. 12, by supporting with a support member a central portion C of a stacked body 50 that is formed by stacking the flat plate 52 on both sides of the corrugated plate 54, and by rotating the support member, the central portion C is rotated in one direction R, whereby the catalyst support 42 in which the stacked body 50 is stacked from the center in the radial direction is formed. In so doing, the flat plate 52 and the corrugated plate 54 are brazed to one another and the catalyst support 42 is formed into a substantially cylindrical shape.

The stacked body 50 may be a plurality of layers formed of a plurality of flat plates 52 and a plurality of corrugated plates 54 that are alternately stacked. Moreover, as described in Japanese Laid-Open Patent Publication No. 2014-147879 mentioned above, the catalyst support 42 may be formed by supporting an end of the stacked body 50 with the support member and by rotating the support member in the direction R.

Next, the substantially cylindrical catalyst support 42 is inserted into the outer cylinder 44 and the catalyst support 42 and the outer cylinder 44 are brazed to one another.

Next, a high-viscosity mixed solution containing the catalytic material is placed on the side of the catalyst support 42 where the one end 42a thereof is located, and a difference in pressure is generated by making the atmospheric pressure on the side where the other end 42b is located lower than the atmospheric pressure on the side where the one end 42a is located. Then, the mixed solution is sucked to the side where the other end 42b is located, whereby the mixed solution enters the honeycomb catalyst support 42 from the side where the one end 42a is located. When passing through the inside of the catalyst support 42, the mixed solution is sucked to the side where the other end 42b is located while making contact with the front surfaces of the flat plate 52 and the corrugated plate 54. As a result, the inner surface of the catalyst support 42 (the surfaces of the flat plate 52 and the corrugated plate 54) is covered with coating containing the catalytic material. The coating that covers the downstream side (the other end 42b side) of the hole 64 becomes thicker than the coating that covers the upstream side (the one end 42a side) of the hole 64.

The mechanism for creating the difference between the thicknesses of the coating is thought to be as follows: when air flows through the catalyst support 42 from the one end 42a to the other end 42b, turbulence occurs in the air flow and stagnation occurs partially. If stagnation occurs in the air flow, there appear places inside of the catalyst support 42 where the highly viscous mixed solution containing the catalytic material is drawn weakly. As a result, the coating at those places becomes thicker relative to the other places.

In order to form the difference between thicknesses of the coating by 3% or more, it is necessary to create stagnation inside the catalyst support 42. For this purpose, it is effective to enlarge the hole 64. In particular, the diameter $2a$ of the hole 64 is set to be twice or more as large as the distance b between the ends of the two adjacent holes 64; that is, $2a>2b$. In the embodiment above, the diameter $2a$ of the hole 64 is 8.0 mm and the distance b between the ends of the two adjacent holes 64 is 3.0 mm; thus the condition $2a>2b$ is satisfied.

When it is desirable that the coating that covers the upstream side (the one end 42a side) of the hole 64 should be thicker than the coating that covers the downstream side (the other end 42b side) of the hole 64, the air pressure on the one end 42a side is set to be lower than the air pressure on the other end 42b side. While the diameter $2a$ of the hole 64 is larger than the distance b between the ends of the two adjacent holes 64, turbulence occurs inside the catalyst support 42 due to the drawing of the mixed solution explained above. As a result, the coating with a nonuniform thickness is formed.

[6. Invention Obtained by the Embodiment]

An invention that can be understood from the abovementioned embodiment will be described below.

The present invention is the catalyst device 36 including: the catalyst support 42 that is formed by the thinned metal flat plate 52 and the thinned metal corrugated plate 54 being stacked and rolled and supports the catalyst; and the outer cylinder 44 that houses the catalyst support 42 therein and supports the catalyst support 42 with the one end 42a of the catalyst support 42 made to face the upstream side of the exhaust gas and the other end 42b of the catalyst support 42 made to face the downstream side of the exhaust gas. The flat plate 52 and the corrugated plate 54 include the plurality of holes 64 and are covered with the coating having a nonuniform thickness and containing the catalytic material.

According to the structure above, the coating that covers the inner surface of the catalyst support 42 is nonuniform. Thus, turbulence of the exhaust gas occurs inside the catalyst support 42, whereby the exhaust gas and the catalyst easily contact each other. As a result, the cleanup of the exhaust gas is promoted, whereby the cleanup of the exhaust gas is efficiently performed.

In the present invention, the coating that covers the downstream side of each of the holes 64 may be thicker than the coating that covers the upstream side of each of the holes 64.

According to the structure above, since the coating that covers the downstream side of the holes 64 is thicker than the coating that overs the upstream side of the holes 64, turbulence of the exhaust gas occurs upstream and downstream of the holes 64 and thus the exhaust gas and the catalyst contact each other more easily. As a result, the cleanup of the exhaust gas is promoted and thus becomes more efficient.

In the present invention, the coating that covers the upstream side of each of the holes 64 may be thicker than the coating that covers the downstream side of each of the holes 64.

According to this structure, since the coating that covers the upstream side of the holes 64 is thicker than the coating that covers the downstream side of the holes 64, turbulence of the exhaust gas occurs upstream and downstream of the holes 64 and thus the exhaust gas and the catalyst contact each other more easily. As a result, the cleanup of the exhaust gas is promoted and thus becomes more efficient.

In the present invention, the difference in thickness between the thickest part of the coating and the thinnest part of the coating may be 3% or more.

According to the structure above, turbulence of the exhaust gas can be generated inside the catalyst support 42.

In the present invention, in a flat state in which the flat plate 52 and the corrugated plate 54 are not yet shaped into the catalyst support 42, the plurality of holes 64 form a plurality of first lines 66 by being aligned in a first direction D1 that is parallel to a direction of an axis of the catalyst support 42 and form a plurality of second lines 68 by being aligned in a second direction D2 that is orthogonal to the first direction D1, of two adjacent second lines 68 out of the plurality of second lines 68, the holes 64 on one second line 68 and the holes 64 on the other second line 68 are separate from each other when viewed from the second direction D2.

According to the structure above, the holes 64 on the second line 68 gather to form the hole portions 80, and along the axial line direction, the hole forming regions 82, the first inter-hole regions 88, and the second inter-hole regions 90 are alternately formed. In this pattern, the coating on the first inter-hole regions 88 is thicker than the second inter-hole regions 90 and thus the turbulence of the exhaust gas easily occurs.

It goes without saying that the catalyst device according to the present invention is not limited to the above-described embodiments and can adopt various configurations within the scope of the present invention.

What is claim is:

1. A catalyst device comprising:
    a catalyst support that is formed by a thinned metal flat plate and a thinned metal corrugated plate being stacked and rolled and that supports a catalyst; and
    an outer cylinder that houses the catalyst support therein and supports the catalyst support with one end of the catalyst support made to face an upstream side of exhaust gas and another end of the catalyst support made to face a downstream side of the exhaust gas,
    wherein the flat plate and the corrugated plate include a plurality of holes and are covered with a coating having a nonuniform thickness and containing a catalytic material,
    a diameter of each of the holes is larger than a distance between ends of two adjacent holes,
    in a cross section of the catalyst support cut along an axial line thereof, hole portions are provided where the flat plate and the corrugated plate are not present, and hole forming regions are provided where the hole portions are formed in relation to a direction of the axial line, wherein the hole forming regions are present at intervals from an upstream side to a downstream side of the catalyst support, in the cross section, the hole forming regions and inter-hole regions where the hole portions are not formed are alternately present,
    each of the inter-hole regions is divided into a first inter-hole region located on a downstream side of each of the hole forming regions and a second inter-hole region located on an upstream side of each of the hole forming regions, and
    the first inter-hole region located on the downstream side and the second inter-hole region located on the upstream side with each of the hole forming regions in between have difference thicknesses.

2. The catalyst device according to claim 1, wherein the coating that covers a downstream side of each of the holes is thicker than the coating that covers an upstream side of each of the holes.

3. The catalyst device according to claim 1, wherein the coating that covers an upstream side of each of the holes is thicker than the coating that covers a downstream side of each of the holes.

4. The catalyst device according to claim 1, wherein a difference in thickness between a thickest part of the coating and a thinnest part of the coating is 3% or more.

5. The catalyst device according to claim 1, wherein in a flat state in which the flat plate and the corrugated plate are not yet shaped into the catalyst support, the plurality of holes form a plurality of first lines by being aligned in a first direction that is parallel to a direction of an axis of the catalyst support and form a plurality of second lines by being aligned in a second direction that is orthogonal to the first direction, of two adjacent second lines out of the plurality of second lines, the holes on one second line and the holes on the other second line are separate from each other when viewed from the second direction.

* * * * *